(12) United States Patent
Previdi et al.

(10) Patent No.: US 9,749,229 B2
(45) Date of Patent: Aug. 29, 2017

(54) FORWARDING PACKETS WITH ENCAPSULATED SERVICE CHAIN HEADERS

(71) Applicant: Cisco Technology, Inc., San Jose, CA (US)

(72) Inventors: Stefano Benedetto Previdi, Rome (IT); James N. Guichard, New Boston, NH (US); Clarence Filsfils, Brussels (BE); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 14/825,273

(22) Filed: Aug. 13, 2015

(65) Prior Publication Data

US 2017/0005920 A1    Jan. 5, 2017

Related U.S. Application Data

(60) Provisional application No. 62/187,492, filed on Jul. 1, 2015.

(51) Int. Cl.
| | | |
|---|---|---|
| *H04L 12/701* | (2013.01) | |
| *H04L 12/723* | (2013.01) | |
| *H04L 12/781* | (2013.01) | |
| *H04L 12/741* | (2013.01) | |
| *H04L 12/46* | (2006.01) | |
| *H04L 12/725* | (2013.01) | |

(Continued)

(52) U.S. Cl.
CPC ........ *H04L 45/507* (2013.01); *H04L 12/4633* (2013.01); *H04L 45/306* (2013.01); *H04L 45/50* (2013.01); *H04L 45/74* (2013.01); *H04L 47/2441* (2013.01); *H04L 69/22* (2013.01)

(58) Field of Classification Search
CPC ................................ H04L 45/38; H04L 45/00
USPC ....... 370/329, 401, 392, 395.5, 428
See application file for complete search history.

(56) References Cited

U.S. PATENT DOCUMENTS

| | | | |
|---|---|---|---|
| 2002/0101868 A1* | 8/2002 | Clear ................. | H04L 12/4633 370/389 |
| 2015/0156035 A1* | 6/2015 | Foo .................... | H04L 47/2441 370/392 |

(Continued)

FOREIGN PATENT DOCUMENTS

| | | |
|---|---|---|
| WO | WO-2015063618 A1 | 5/2015 |
| WO | WO-2015094296 A1 | 6/2015 |

OTHER PUBLICATIONS

Quinn et al. "Network Service Header—draft-quinn-sfc-nsh-07.txt" ;Network Working Group, Internet-Draft; Feb. 24, 2015; pp. 1-43.

(Continued)

*Primary Examiner* — Alpus H Hsu
*Assistant Examiner* — Camquyen Thai
(74) *Attorney, Agent, or Firm* — Parker Ibrahim & Berg LLC; James M. Behmke; Stephen D. LeBarron

(57) ABSTRACT

In one embodiment, a device in a network receives a packet that includes a forwarding label for a service in a service chain. The packet encapsulates a service chain header for the service chain. The device swaps the forwarding label for the service in the packet for a reserved label that identifies the packet as encapsulating the service chain header. The device forwards the packet with the reserved label to the service.

22 Claims, 18 Drawing Sheets

(51) Int. Cl.
H04L 12/851 (2013.01)
H04L 29/06 (2006.01)

(56) References Cited

U.S. PATENT DOCUMENTS

2015/0195197 A1    7/2015  Yong et al.
2015/0326473 A1*  11/2015  Dunbar .............. H04L 12/4633
                                                          370/392
2016/0352629 A1*  12/2016  Wang .................... H04L 41/50

OTHER PUBLICATIONS

Halpern et al. "Service Function Chaining (SFC) Architecture—draft-ietf-sfc-architecture-09" Network Working Group, Internet-Draft; Jun. 7, 2015; pp. 1-29.

* cited by examiner

FORWARDING PACKETS WITH ENCAPSULATED SERVICE CHAIN HEADERS

RELATED APPLICATIONS

This application claims priority to U.S. Provisional Application No. 62/187,492, filed Jul. 1, 2015, entitled: "MPLS-SR FORWARDING OF NSH ENCAPSULATED PACKETS," by Previdi et al., the contents of which are herein incorporated by reference.

TECHNICAL FIELD

The present disclosure relates generally to computer networks, and, more particularly, to forwarding packets with encapsulated service chain headers in a computer network.

BACKGROUND

Multiprotocol label switching (MPLS) is a packet switching technology that allows routing decisions to be based on labels that are appended to the headers of packets. Such a label represents a path in the network and is used to make forwarding decisions until the corresponding packet reaches its destination. Once the packet reaches its destination, the destination device may "pop" (e.g., remove) the corresponding label from the header of the packet and/or apply another label to the packet, to continue routing the packet throughout the network.

Segment routing is a routing technology that may be used in conjunction with MPLS. For example, MPLS labels may be carried in routing protocol messages to enable segment routing in the network. Segment routing defines two forms of segments: adjacency segments and node segments. In general, adjacency segments correspond to a specific adjacency/interface of a given node. In contrast, node segments are more global in nature and represent the shortest path to a node. Notably, the target node of a node segment may be assigned a unique identifier used within the network. Thus, a label switched path (LSP) may be formed by concatenating any number of adjacency and/or prefix segments. When a device along an LSP receives a packet that has a segment as the top label, that label may be reused by any number of intermediary devices to route the packet to the target node associated with the segment. For example, assume that a path exists from nodes A→B→C→D. If node A receives a packet having a top label/node segment associated with node D, it may swap the label with itself and forward the packet to node B. Node B may perform a similar operation and forward the packet on to node C. Node C may then pop the label off of the stack and forward the packet with any remaining labels to node D.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments, a device in a network receives a packet that includes a forwarding label for a service in a service chain. The packet encapsulates a service chain header for the service chain. The device swaps the forwarding label for the service in the packet for a reserved label that identifies the packet as encapsulating the service chain header. The device forwards the packet with the reserved label to the service.

In further embodiments, a first device in a network receives a packet for forwarding through the network. The first device appends a service chain header to the packet for a service chain. The first device encapsulates the service chain header for the service chain in the packet by appending a set of forwarding labels to the packet. The set of forwarding labels includes a particular forwarding label that identifies a particular service in the service chain. The first device forwards, based on the set of forwarding labels, the packet including the encapsulated service chain header into the network. The particular forwarding label is operable to cause a second device in the network to swap the particular forwarding label for a reserved label that identifies the packet as encapsulating the service chain header.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
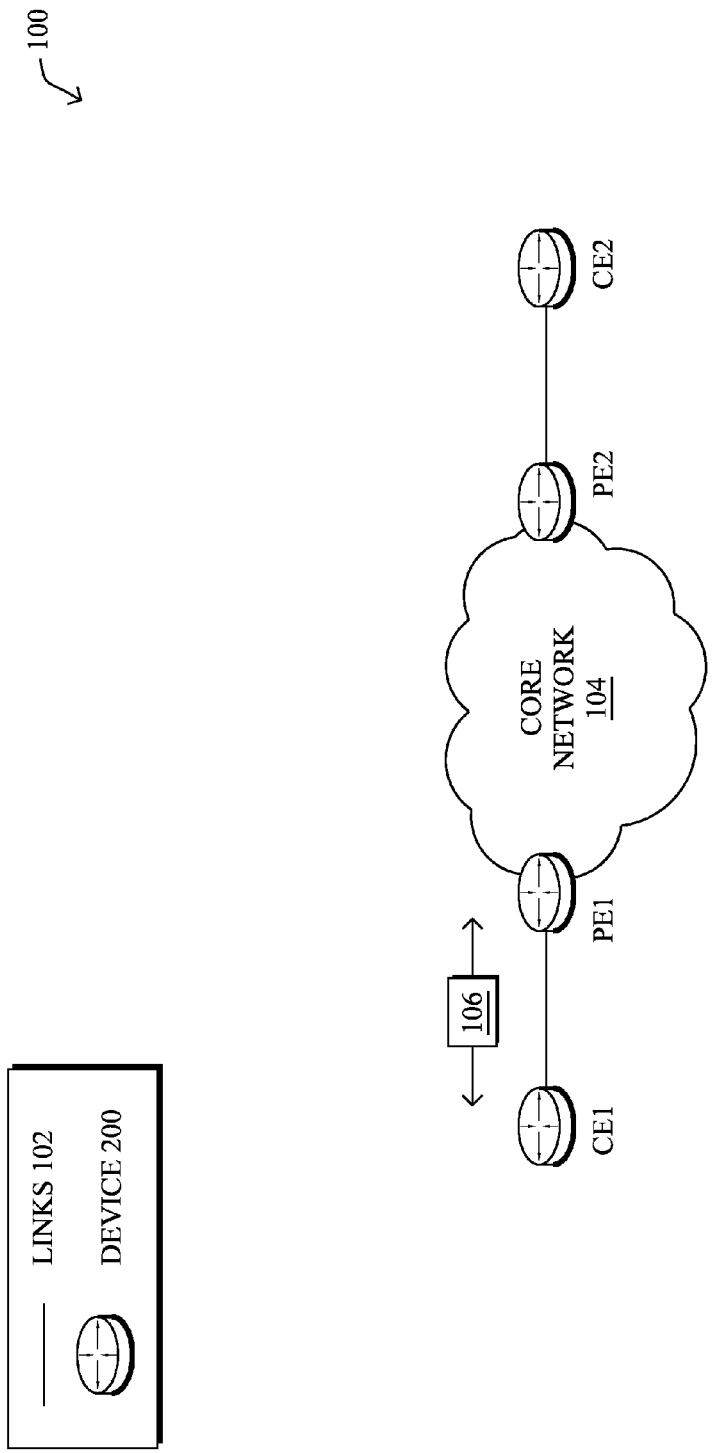
FIG. 1 illustrates an example communication network.

FIG. 1 is a schematic block diagram of an example computer network 100 illustratively comprising nodes/devices 200, such as a plurality of routers/devices interconnected by links or networks, as shown. For example, customer edge (CE) routers (e.g., CE1 and CE2) may be interconnected with provider edge (PE) routers (e.g., PE1 and PE2, respectively), to communicate across a core network, such as an illustrative core network 104. Core network

104 may be a Multi-Protocol Label Switching (MPLS) network or, alternatively, any other form of network (e.g., Internet-based, etc.).

Data packets 106 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 2:
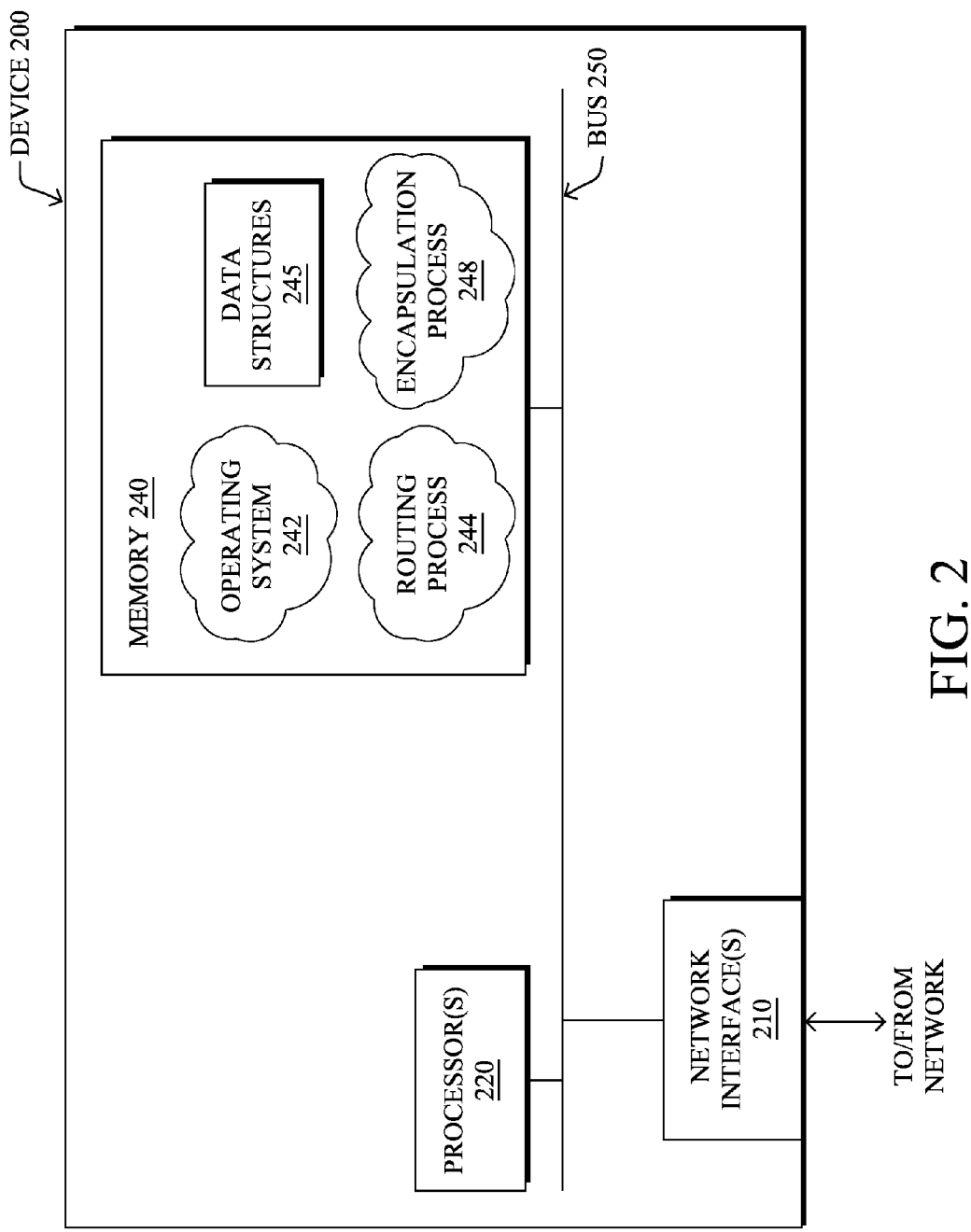
FIG. 2 illustrates an example network device/node.

FIG. 2 is a schematic block diagram of an example node/device 200 that may be used with one or more embodiments described herein, e.g., as any of the routers of network 100, or any other computing device that supports the operations of network 100 (e.g., switches, servers, etc.). Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may include a routing process 244 and/or a packet encapsulation/decapsulation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP) (e.g., in conjunction with process 248), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

In various embodiments, routing process 244 may be configured to perform segment routing in the network, such as, e.g., in conjunction with MPLS. For example, routing process 244 may utilize extensions to the IGP (e.g., IS-IS, OSPF, etc.), that allow IGP messages to carry MPLS label information, to enable segment routing (MPLS-SR). As noted previously, segments in a segment routed network may fall into one of two categories: node segments and adjacency segments. Adjacency segments generally represent the local interface between a given node and an adjacent neighbor. Notably, adjacency segments do not need to be unique among the different nodes, as adjacency segments only require local significance to the particular node. Node segments, in contrast, are global in nature and use unique identifiers to represent node segment endpoints. When used in conjunction with MPLS, segments (e.g., node and adjacency segments) may be treated as labels, whereby a node may either "push" a new segment/label onto the stack, "pop" (e.g., remove) the top segment/label from the stack, or "swap" the top label of the stack with another label.

In further embodiments, routing process 244 may be operable to implement the Service Function Chaining (SFC) architecture. Details regarding the SFC architecture can be found in the Internet Engineering Task Force (IETF) draft entitled, "Service Function Chaining (SFC) Architecture" by J. Halpern, et al., which is hereby incorporated by reference. In general, SFC facilitates the use of network services and provides for network location techniques to locate the device (s) that support these services. Example services may include, but are not limited to, caching services, firewall services, anti-intrusion services, malware detection services, deep packet inspection (DPI) services, acceleration services, load balancing services, lawful intercept (LI) services, optimization services, etc. In particular, a service function chain comprises an ordered set of services that may be provided to network traffic based on the classification of the traffic.

As part of the SFC architecture, a service function path (SFP) may be defined that indicates to which services a certain packet must be sent (e.g., which services are to perform their respective functions on the packet). The packet/frame may then be encapsulated, to include an indication of the SFP. Of note is that SFC encapsulation is used solely to include data plane context information and is not used for purposes of network packet forwarding. In particular, a network service header (NSH) may be added to a packet or frame, to convey metadata and service path information that may be used to create the service plane. For transport, the NSH and packet may be encapsulated in an outer header. Details regarding an NSH protocol header can be found in the IETF draft entitled, "Network Service Header," by P. Quinn, et al., the contents of which are hereby incorporated by reference.

As noted above, the NSH architecture provides the mechanisms for the construction of service chains in a network and the forwarding of traffic through those service chains using network service headers carried within the data plane. The network service headers are imposed on to the original packet/frame through classification. An outer encapsulation used for transport between individual services of the service chain is then pushed on to the packet/frame. Forwarding of packets/frames is achieved at the service plane layer using the NSH headers. Specifically, a Service Path Identifier (SPI) and Service Index (SI) are used for this purpose. A unique SPI is used to identify a given service path instantiation of a service chain, and the SI is initialized to the total number of services within the service chain, and decremented at each service hop as packets/frames traverse through the service path.

Challenges persist in using segment routing over certain data planes as the outer transport for an NSH such as, e.g., using MPLS data planes. In particular, a mechanism is needed to allow packets to flow through a service chain (e.g., an NSH-based service chain, etc.) while maintaining the segment list (e.g., the MPLS label stack, other segment label stacks, etc.) as the mechanism for steering traffic through the necessary services. Further, techniques are needed to instruct the service, within the constructs of the segment routing mechanism, that a service follows (e.g., an NSH-based service, etc.).

Using segment routing for service chaining allows the label stack to be computed and inserted at the ingress of the path, thereby relaxing the requirement of keeping state in the network. Applied to SFC, this means that the list of services the packet has to traverse may be determined by the ingressing device (or through an interaction with a controller) and imposed in the form of a label stack by the device injecting the packet into the network.

Forwarding Packets with Encapsulated Service Chain Headers

The techniques herein generally provide methods to a.) indicate within a forwarding label stack (e.g., an MPLS label stack, etc.) that the packet encapsulates a service chain header (e.g., an NSH protocol header, etc.) and b.) implement the necessary forwarding operations at the transport layer to successfully steer traffic through a service chain using the label stack.

Specifically, according to one or more embodiments of the disclosure as described in detail below, a device in a network receives a packet that includes a forwarding label for a service in a service chain. The packet encapsulates a service chain header for the service chain. The device swaps the forwarding label for the service in the packet for a reserved label that identifies the packet as encapsulating the service chain header. The device forwards the packet with the reserved label to the service.

Illustratively, the techniques described herein may be performed by hardware, software, and/or firmware, such as in accordance with the process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, and as such, may be processed by similar components understood in the art that execute those protocols, accordingly.

Operationally, the techniques herein involve two fundamental building blocks:

1.) the ability for identification of an encapsulated service chain header (e.g., an NSH protocol header, etc.) within a forwarding label stack (e.g., an MPLS label stack constructed using segment routing signaling, etc.); and 2.) the forwarding operations at the transport layer to successfully forward packets through a service chain using the forwarding label stack.

According to various embodiments, to identify an encapsulated service chain header (e.g., an NSH protocol header, etc.) via the transport layer label stack, the label stack may include an indication to the service that the service chain header exists below the transport layer label stack. While there are theoretically many ways to identify a given encapsulation that follows the bottom of a transport layer label stack (e.g., an MPLS label stack, IPv6-based data planes that use segment routing, etc.), the teachings herein propose the use of SR-meaningful labels within a specific context, according to various embodiments. In particular, a reserved label having a predefined value (e.g., a value of <100>) may be used for this purpose. Other reserved label values may be used in other implementations. The semantics of such a label value indicates that a service chain header directly follows the bottom-of-label-stack. Further, this reserved value may be used within a specific context in an SR-aware service chain, and may not be added at the beginning of an SFP, in some embodiments. An example of such a mechanism is shown in FIG. 3, according to various embodiments.

Figure 3:
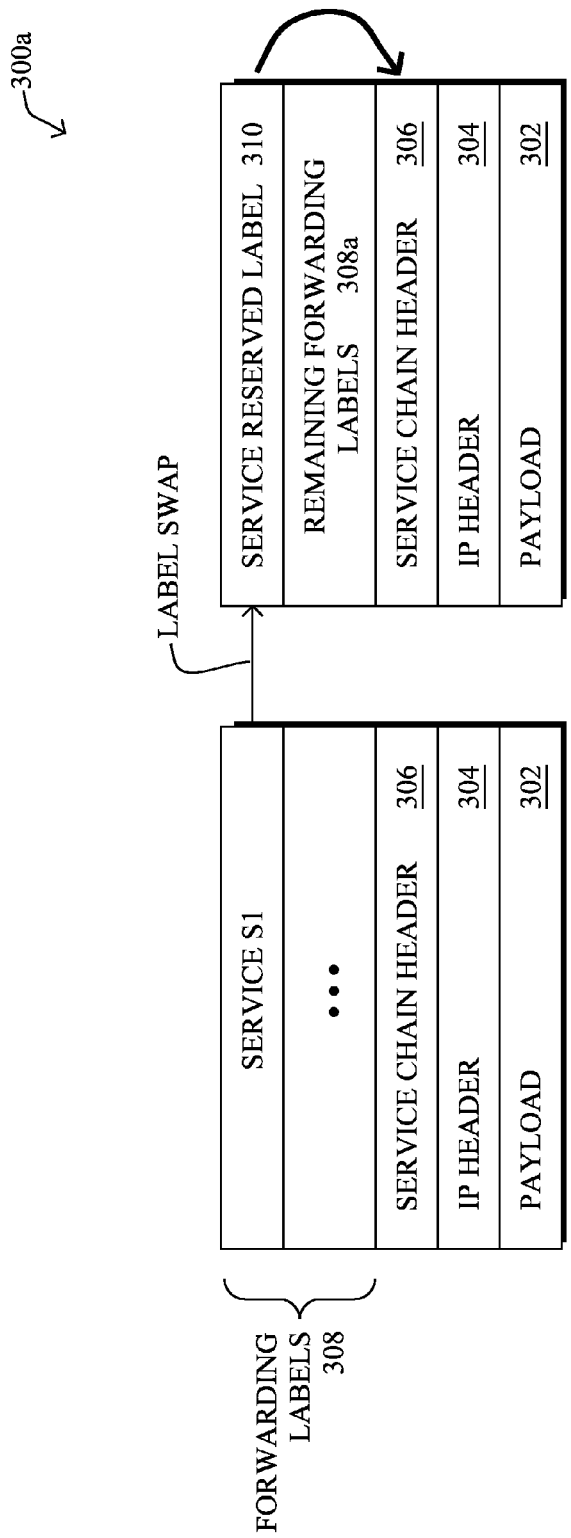
FIG. 3 illustrates an example of a forwarding label being swapped for a reserved label.

As shown in FIG. 3, consider a packet 300 that has been forwarded into a core network by an ingress/border device, whereby the core network includes a simple service chain that has two services. In particular, the chain may be of the form:

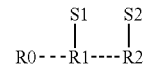

where R0 is the classification/ingress point in the core network, S1 and S2 are the respective services, and R1 and R2 are routers in the network. Generally, packet 300 may include a payload 302 (e.g., application data, etc.) and corresponding header 304 for use outside of the core network. For example, header 304 may be an IPv4 or IPv6 header that indicates the source address of the device that originated packet 300 and the address of the destination of packet 300.

In response to receiving packet 300, R0 may classify packet 300 and, based on an analysis/classification of packet 300, select an appropriate service chain for packet 300 (e.g., based on the source address, destination address, payload 302, other information, etc.). When a service chain header enabled service chain must be built (e.g. an NSH-enabled service chain, etc.), the original packet at the classification point may be encapsulated with a service chain header. For example, R0 may add service chain header 306 to packet 300, which may include metadata for use by the service(s) in the chain, an indication of the service path, or other such information to support the service chain.

In various embodiments, the classification/ingress device R0 may also generate a set of forwarding labels 308 as part of a label stack (e.g., an MPLS-SR label stack, etc.). Continuing the example above, forwarding labels 304 may include the following labels:

R1
S1
R2
S2
EGRESS where each of the labels may be a segment label used for purposes of forwarding packet 300 in the network. Note that labels S1 and S2 may be local label values allocated respectively by R1 and R2. The classification/ingress device R0 may then push forwarding labels 308 onto packet 300, thereby encapsulating the service chain header 306 (e.g., an NSH protocol header). In other words, forwarding labels

308 may form what is effectively a "segment header" that is identified by a series of segment identifiers (SIDs) and encapsulates the service chain header 306 (e.g., an NSH protocol header, etc.).

The packet 300 may then be sent towards R1 according to the top label (representing R1). According to normal label switching operations, the upstream neighbor of R1 will pop the top label so that the packet arrives in R1 with the label stack 308 of:

S1
R2
S2
EGRESS

In various embodiments, forwarding labels S1 and S2 may be operable to cause a device in the network to swap the incoming label (e.g., S1 or S2) with an outgoing reserved label that is known to the service chain. For example, as shown in FIG. 3, in response to receiving packet 300 (e.g., at router R1) with label S1 as the topmost label in the stack, the device R1 may swap label S1 in forwarding labels 308 for a service reserved label 310 (e.g., <100>, etc.). In turn, R1 may send the updated packet 300a out to its interface connected with service S1. Similarly, in R2, the instruction associated with the label for S2 (e.g., in remaining forwarding labels 308a) may be: swap incoming label value S2 with outgoing label value <100> (e.g., the reserved label 310) and send the packet through interface connecting with service S2.

As would be appreciated, the normal packet operation performed by R1 would be to pop the top label S1 from the stack, prior to forwarding packet 300 on to the service S1. However, with the mechanism proposed herein, R1 instead performs a SWAP operation on the topmost label (e.g., the label that indicates the service), replacing the topmost label with the reserved label (e.g., label <100>). In particular, the forwarding information base (FIB) programming of R1 may be: {SWAP; <100>} (in <S1>, out <100>) instead of a POP. R1 then executes the following instruction: incoming label: S1, Outgoing label: <100>, outgoing interface R1S1, and sends the packet with a top label <100> to S1.

Generally, the value of reserved label 310 (e.g., <100>) may indicate that packet 300a is NSH encapsulated or encapsulates another form of service chain header. It may be stressed again that the label <100>, which may act as an NSH-aware service indicator and as NSH-encapsulated user packet, may be applied at device R1, in contrast to other devices such as R0 or at the SFP head-end. This allows the label <100> to be in the context from R1 to S1. In addition, a single reserved label value may be used to instruct the application to look at the NSH header, without overloading S1 with state about all existing applications in the network.

In some embodiments, service S1 may be service chain header-aware and configured to identify reserved label 310 (e.g., <100>, etc.) as indicating that service chain header 306 is encapsulated below the transport layer stack comprising forwarding labels 308a. In turn, service S1 may execute the following instruction that is associated with reserved label 310: incoming label <100>, action: pop and inspect service chain header 306. In other words, reserved label 310 may cause service S1 to decapsulate packet 300a, to expose and use service chain header 306 when performing the corresponding function/service on packet 300a. After performing the required service (e.g., malware detection, etc.) on the packet, service S1 may append the removed forwarding labels 308a back onto packet 300a as follows:

R2
S2
EGRESS

Service S1 then forwards the packet towards R2. Processing of the packet beyond service S1 may then proceed as follows:

An upstream neighbor of R2 pops the top label, thereby removing the R2 label before forwarding the packet to R2.
R2 swaps incoming label S2 with the reserved label <100>.
R2 sends the packet to S2.
S2 recognizes the reserved label.
S2 pops the reserved label.
S2 removes service chain header 306, as the service index within the base service chain header is 1 (e.g., indicating the end of the service chain).
S2 returns the packet with a forwarding label of EGRESS.
The packet is then forwarded towards the egress point of the domain.

Figure 4A:
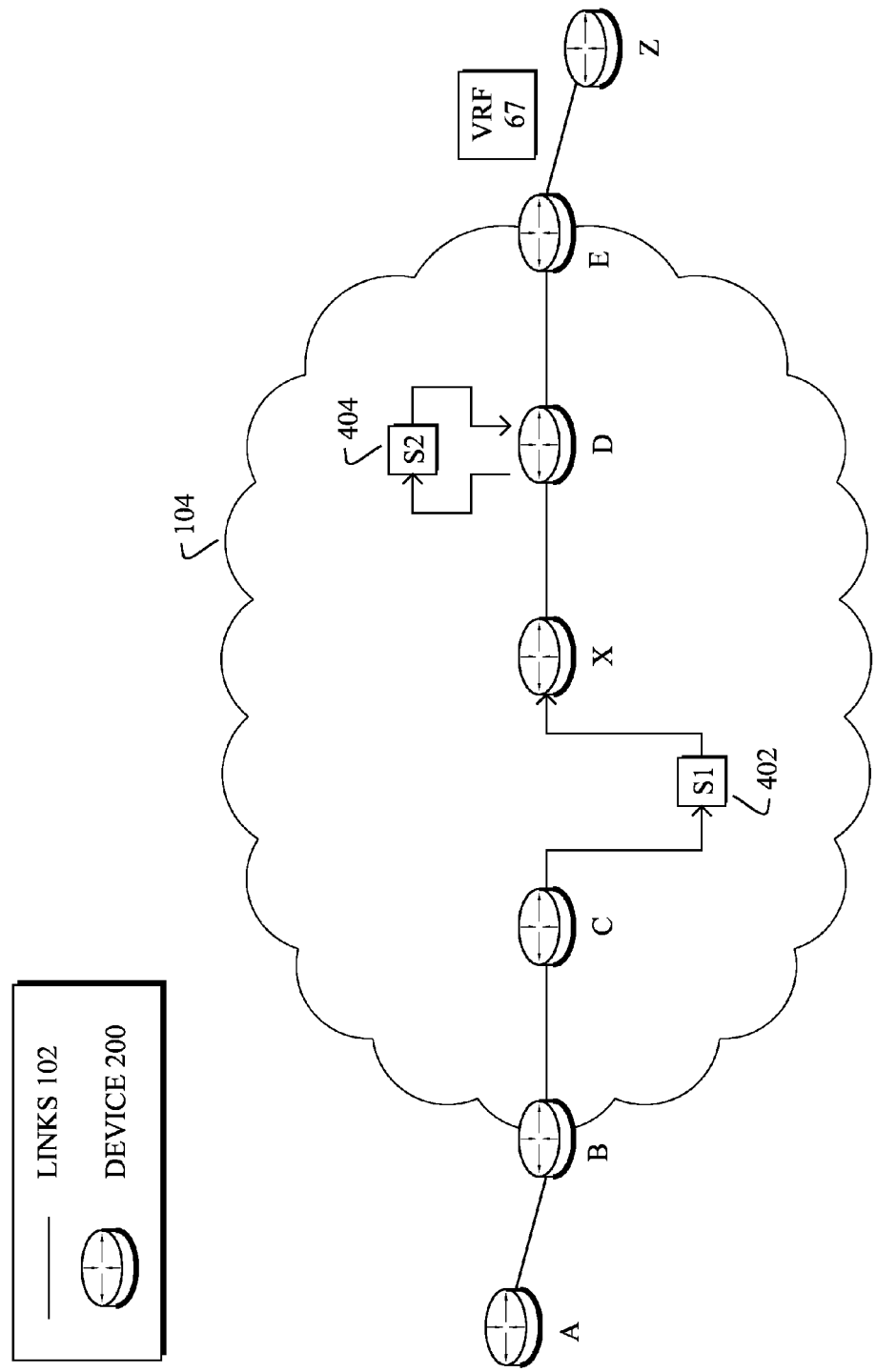
FIGS. 4A-4N illustrate examples of a packet being forwarded through a network.
Figure 4B:
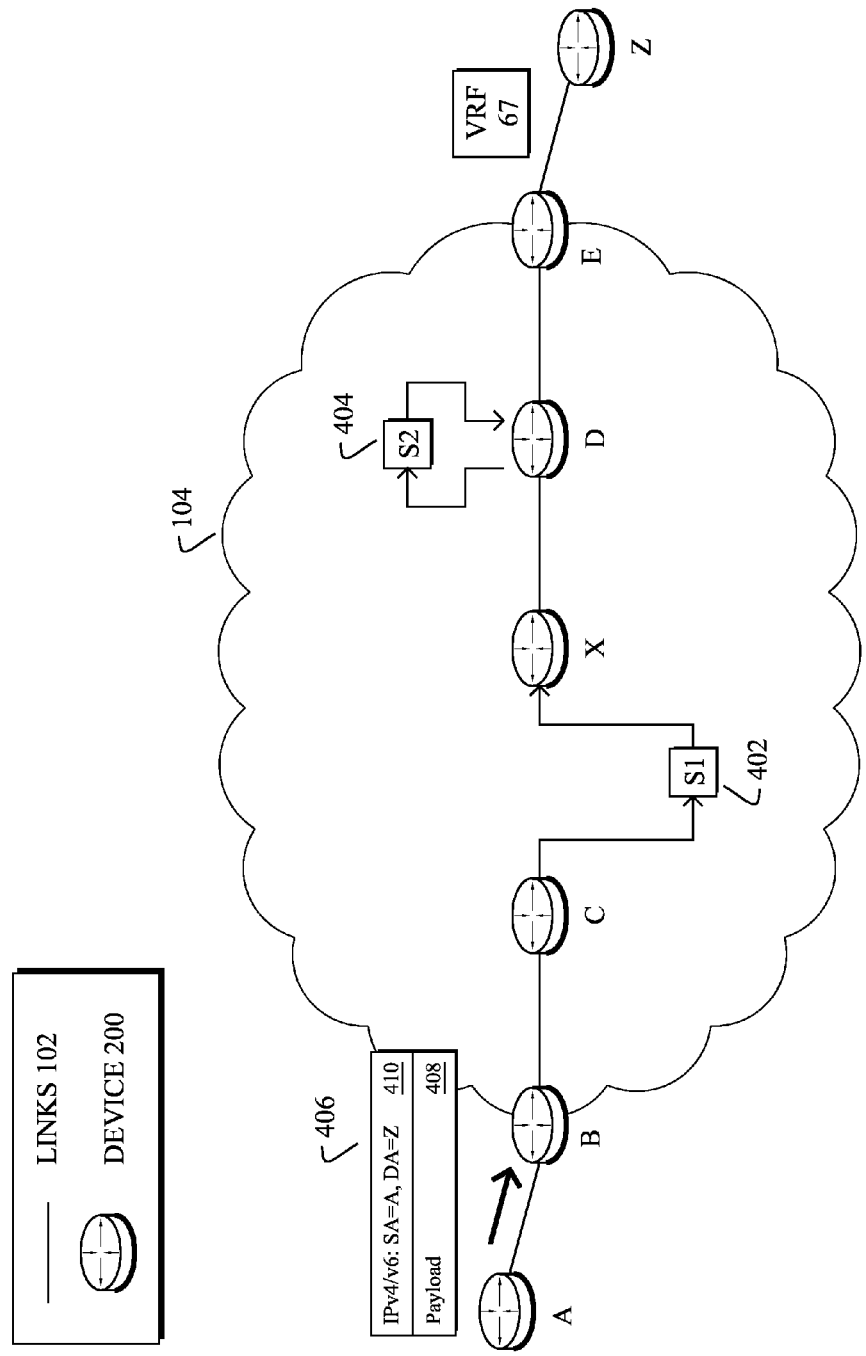
Figure 4C:
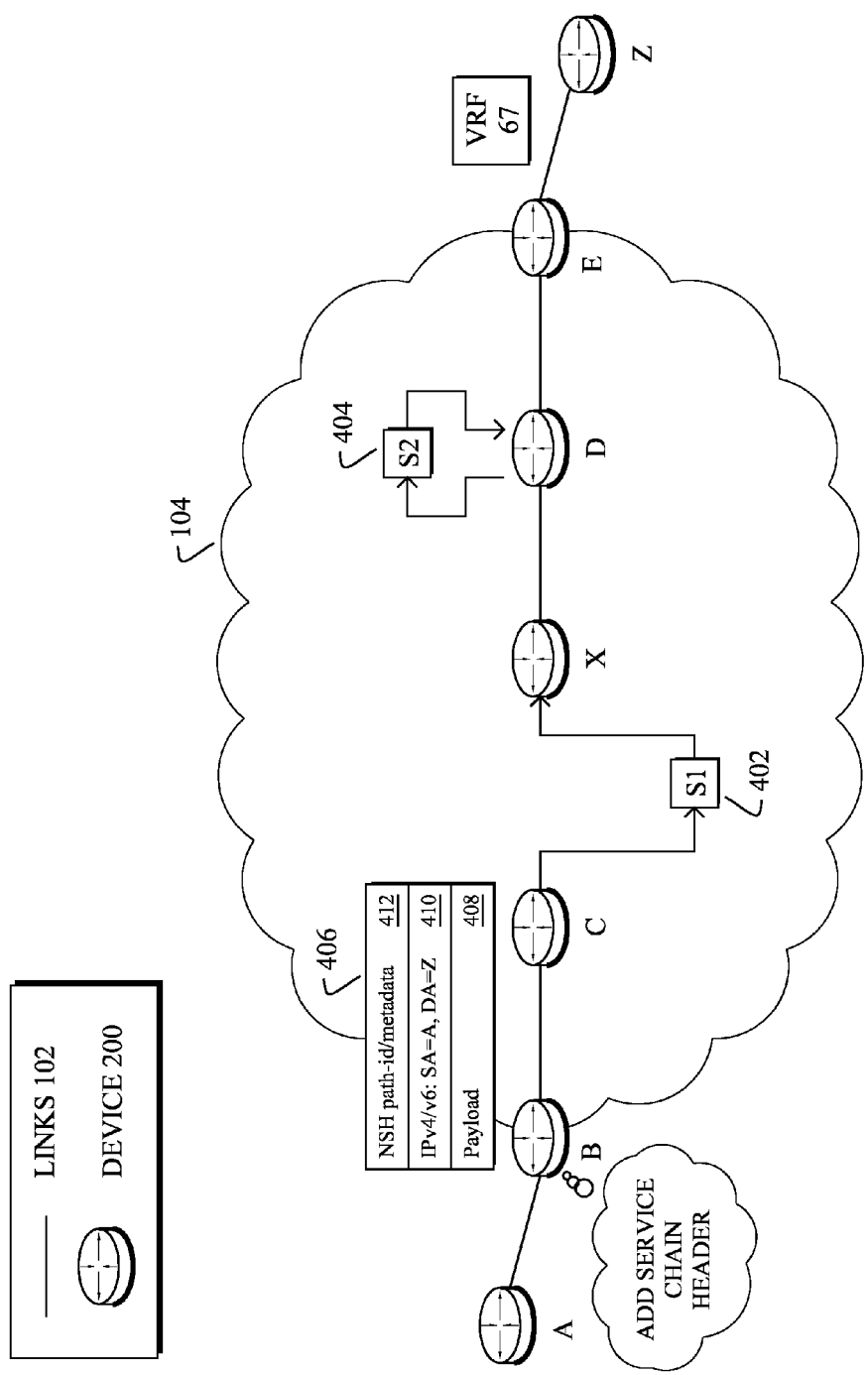
Figure 4D:
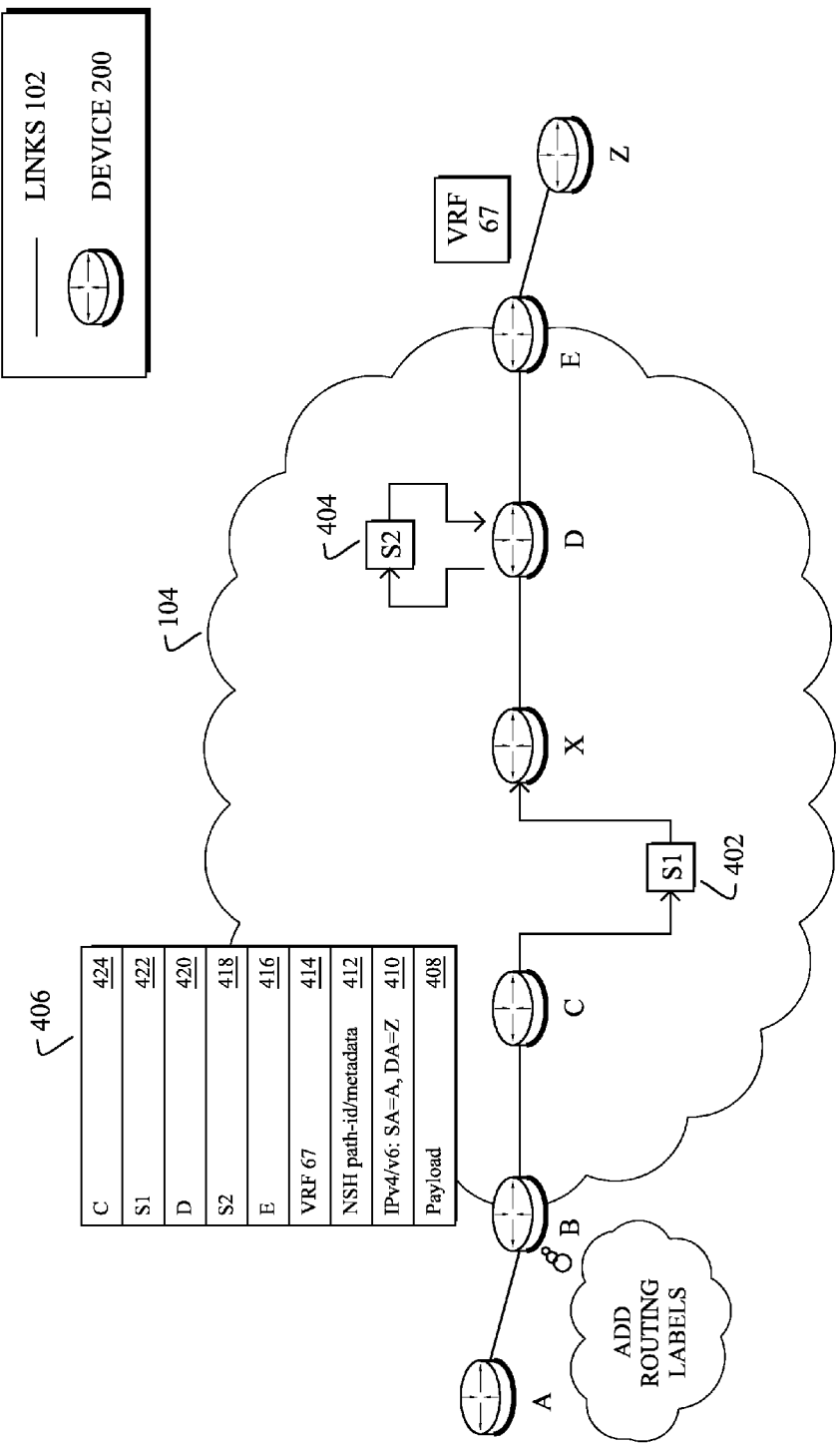
Figure 4E:
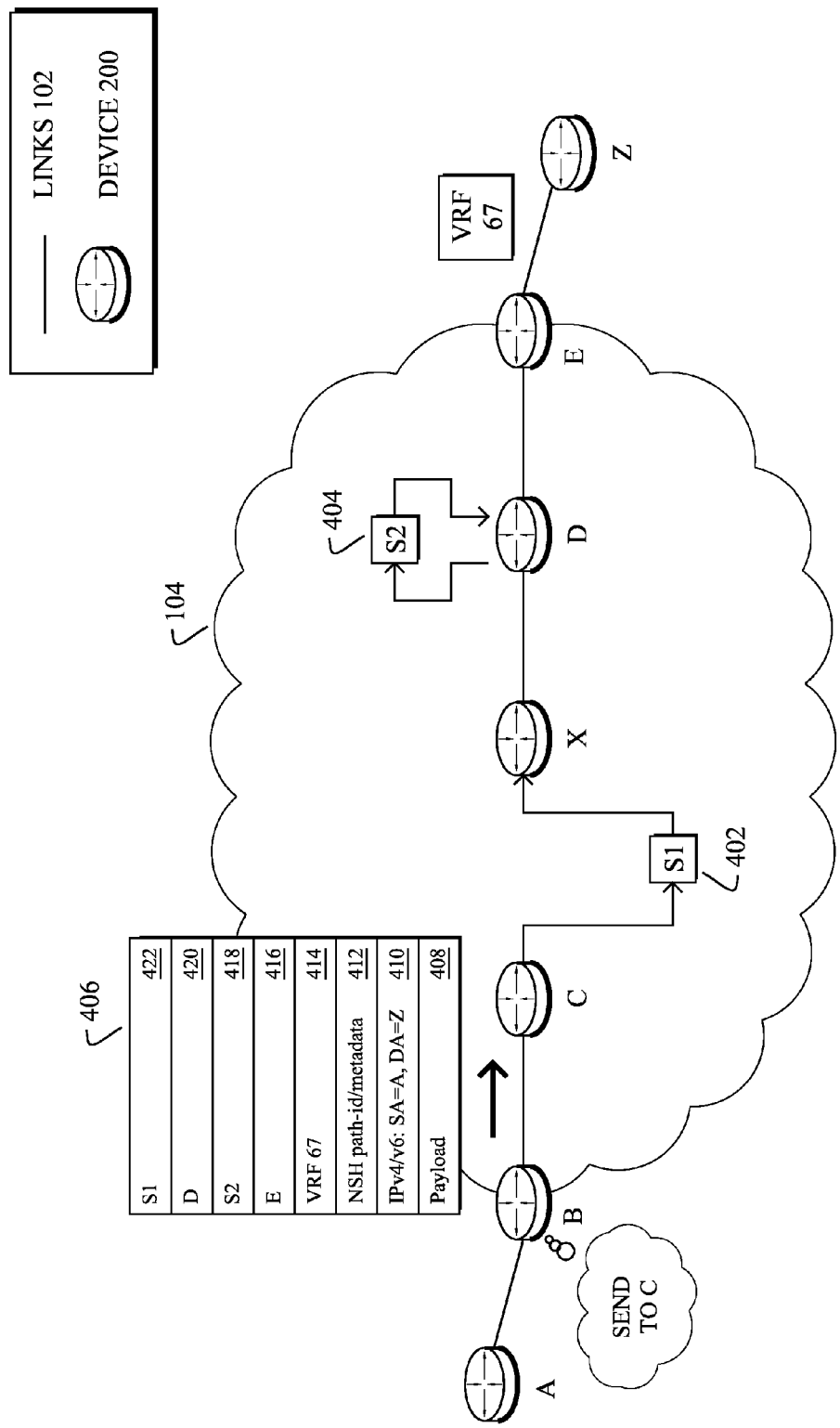
Figure 4F:
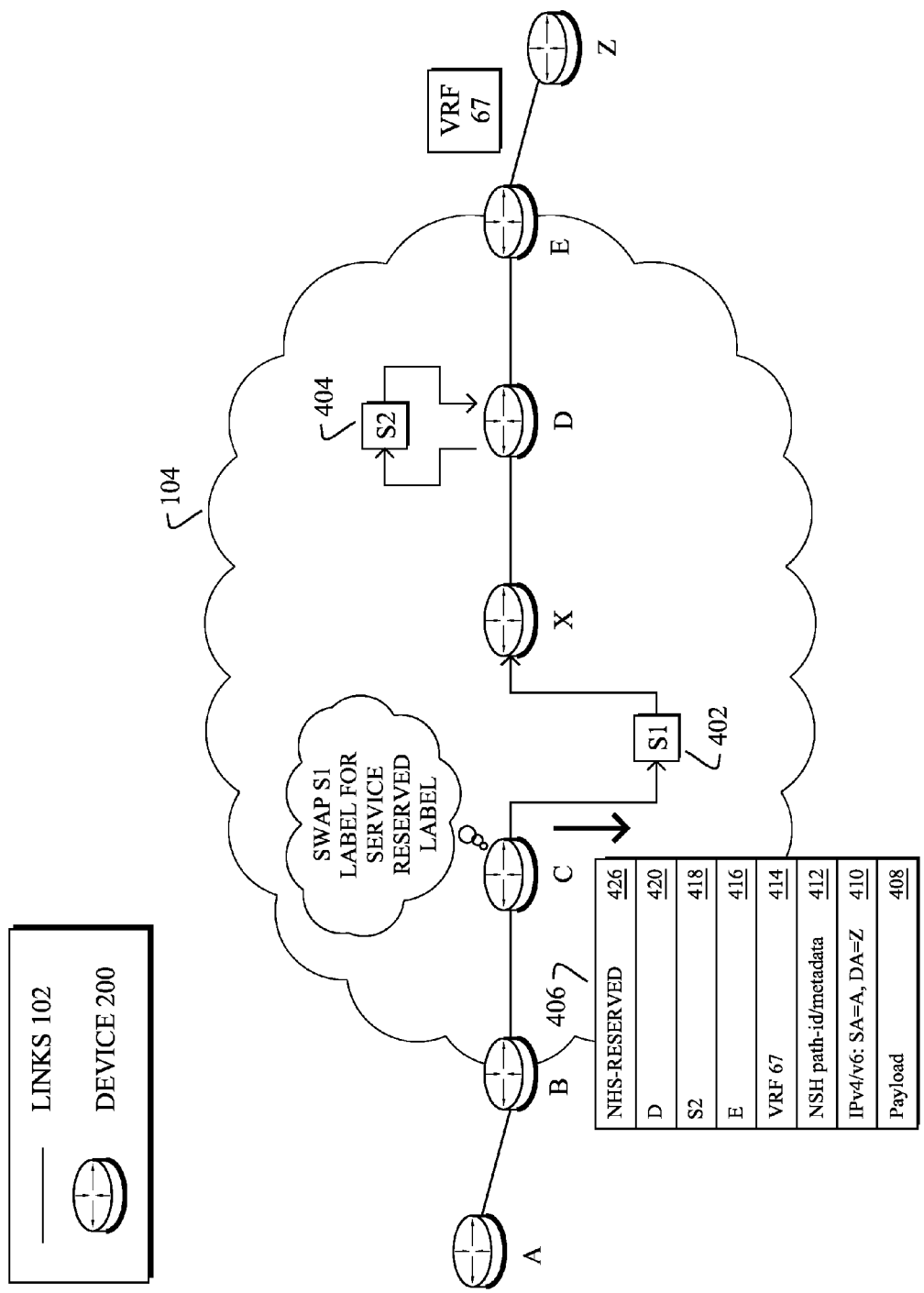
Figure 4G:
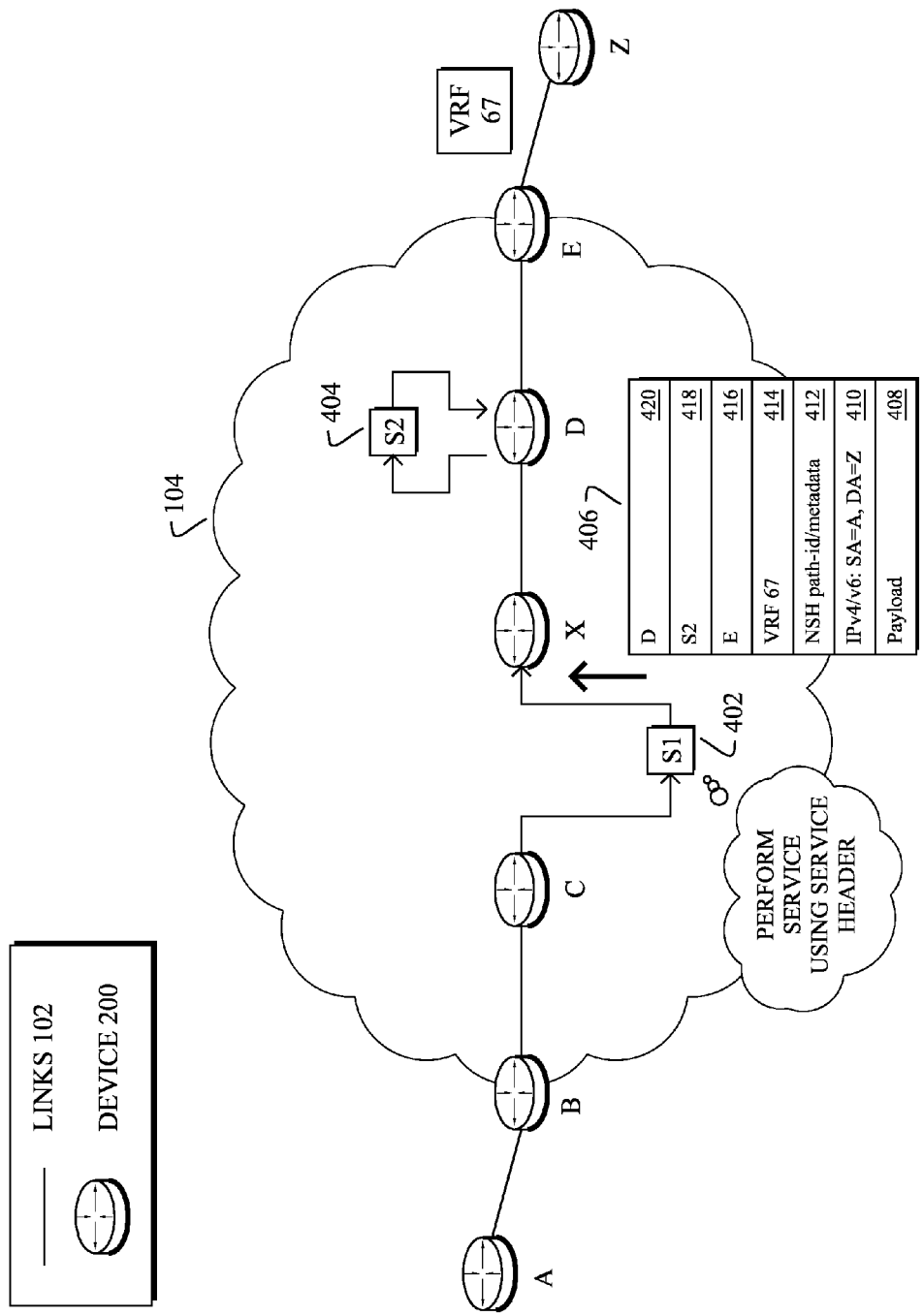
Figure 4H:
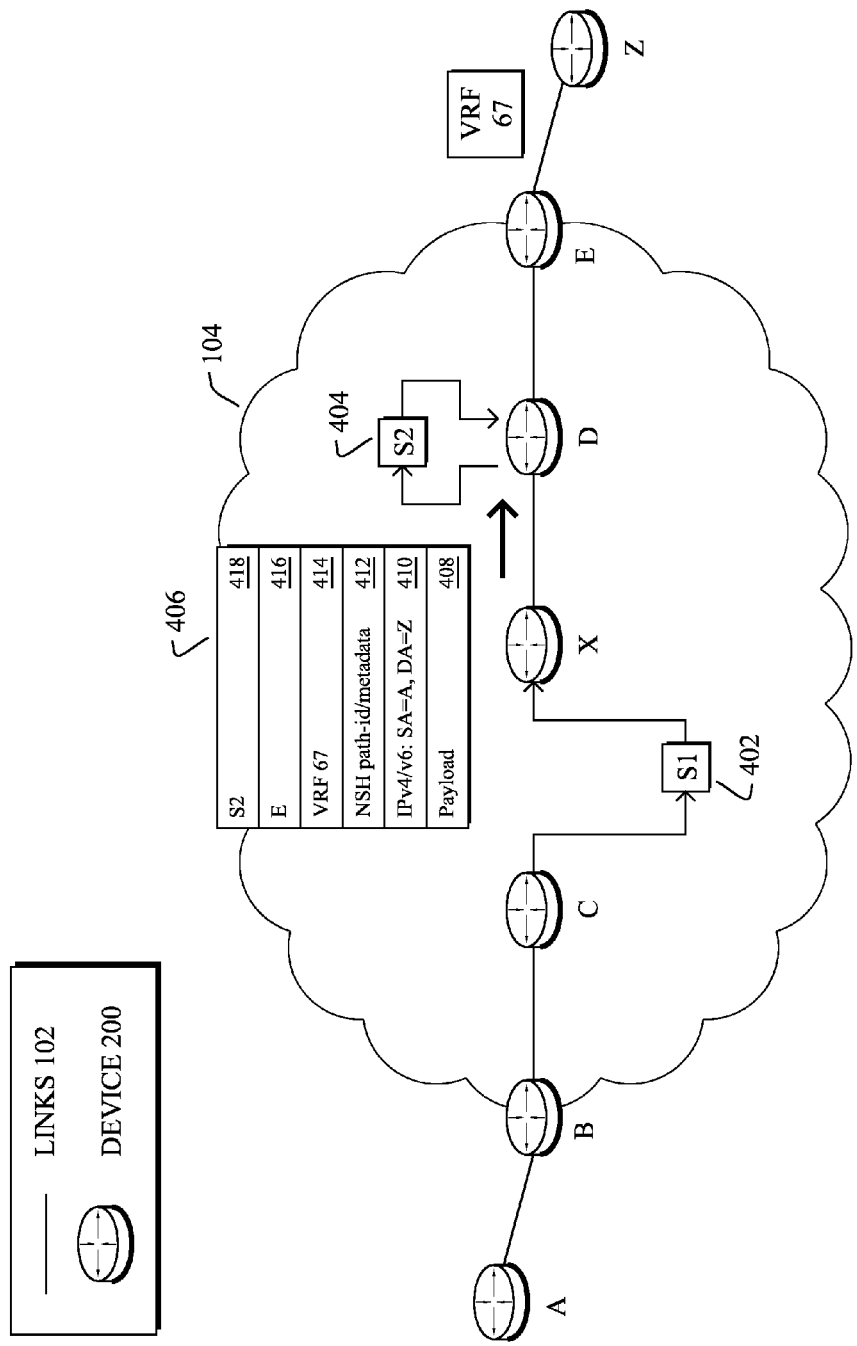
Figure 4I:
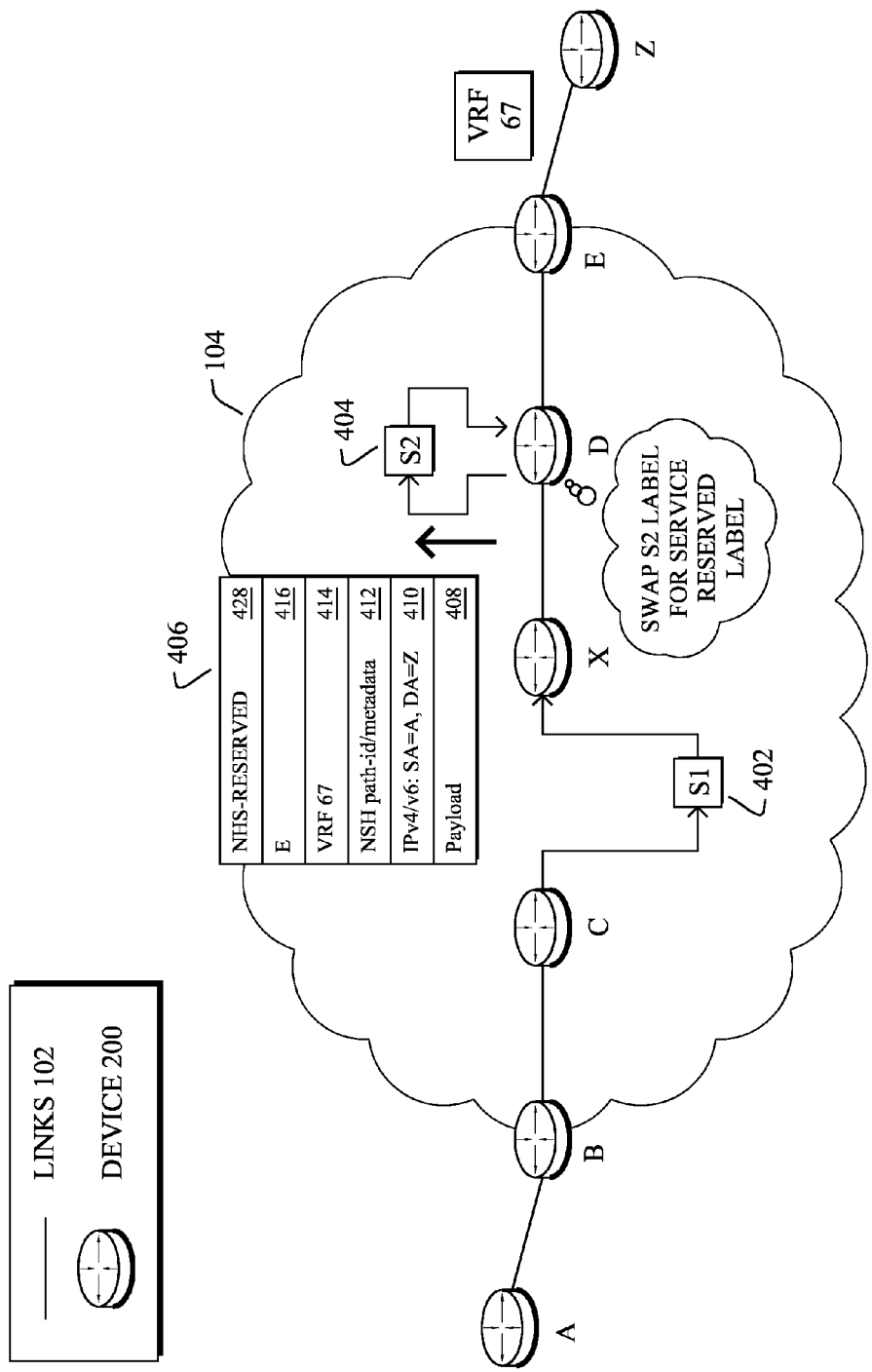
Figure 4J:
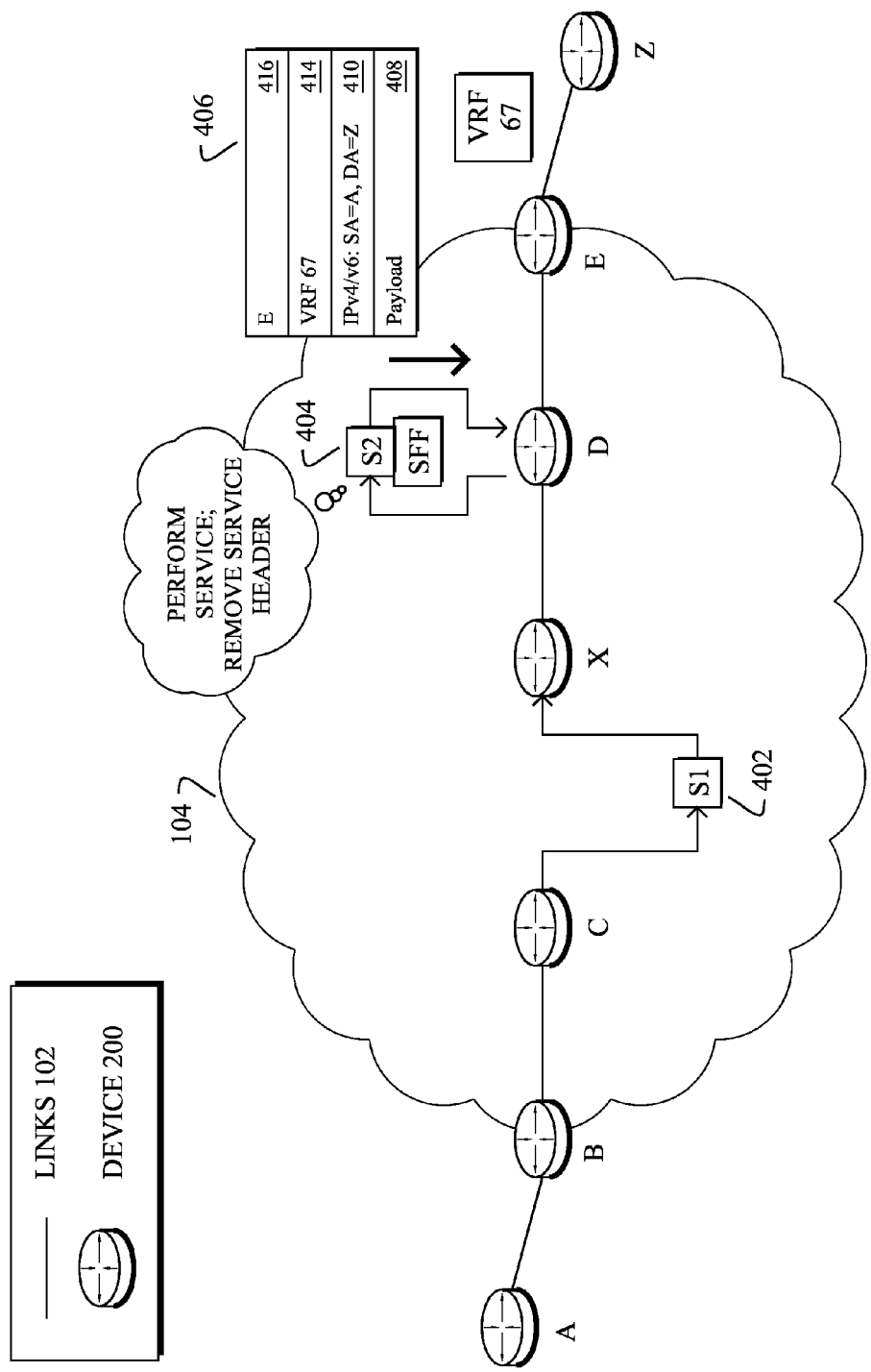
Figure 4K:
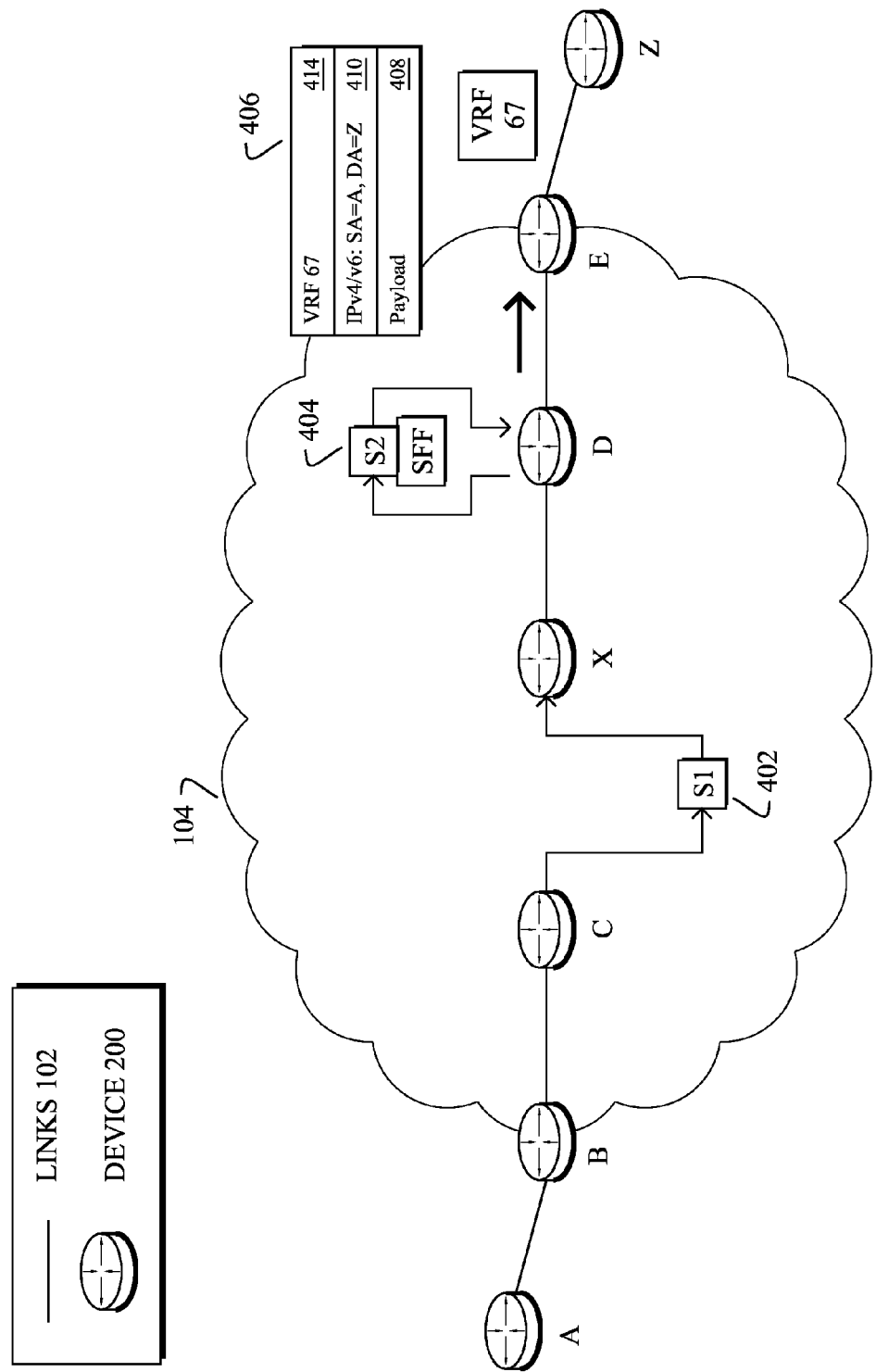
Figure 4L:
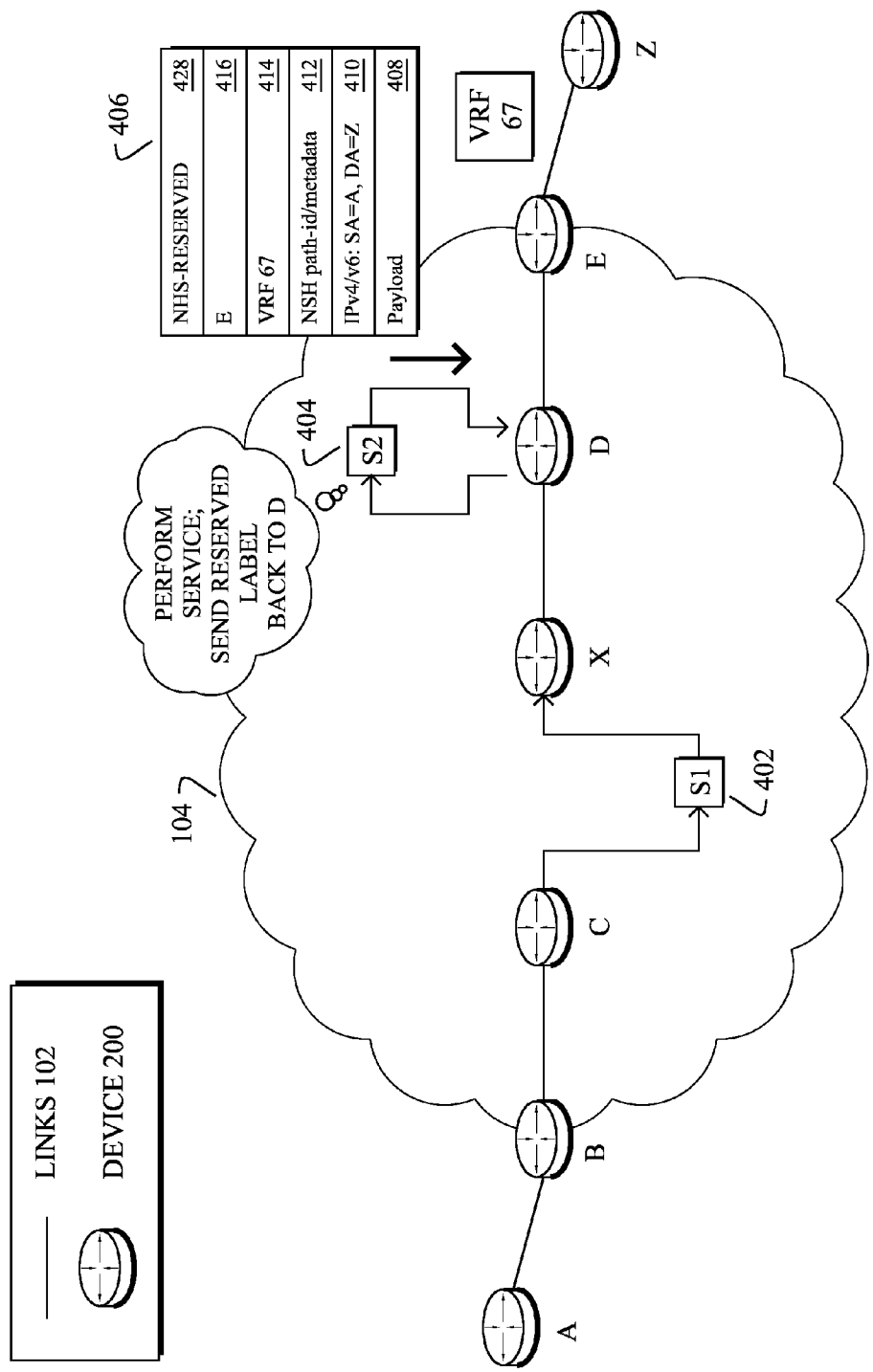
Figure 4M:
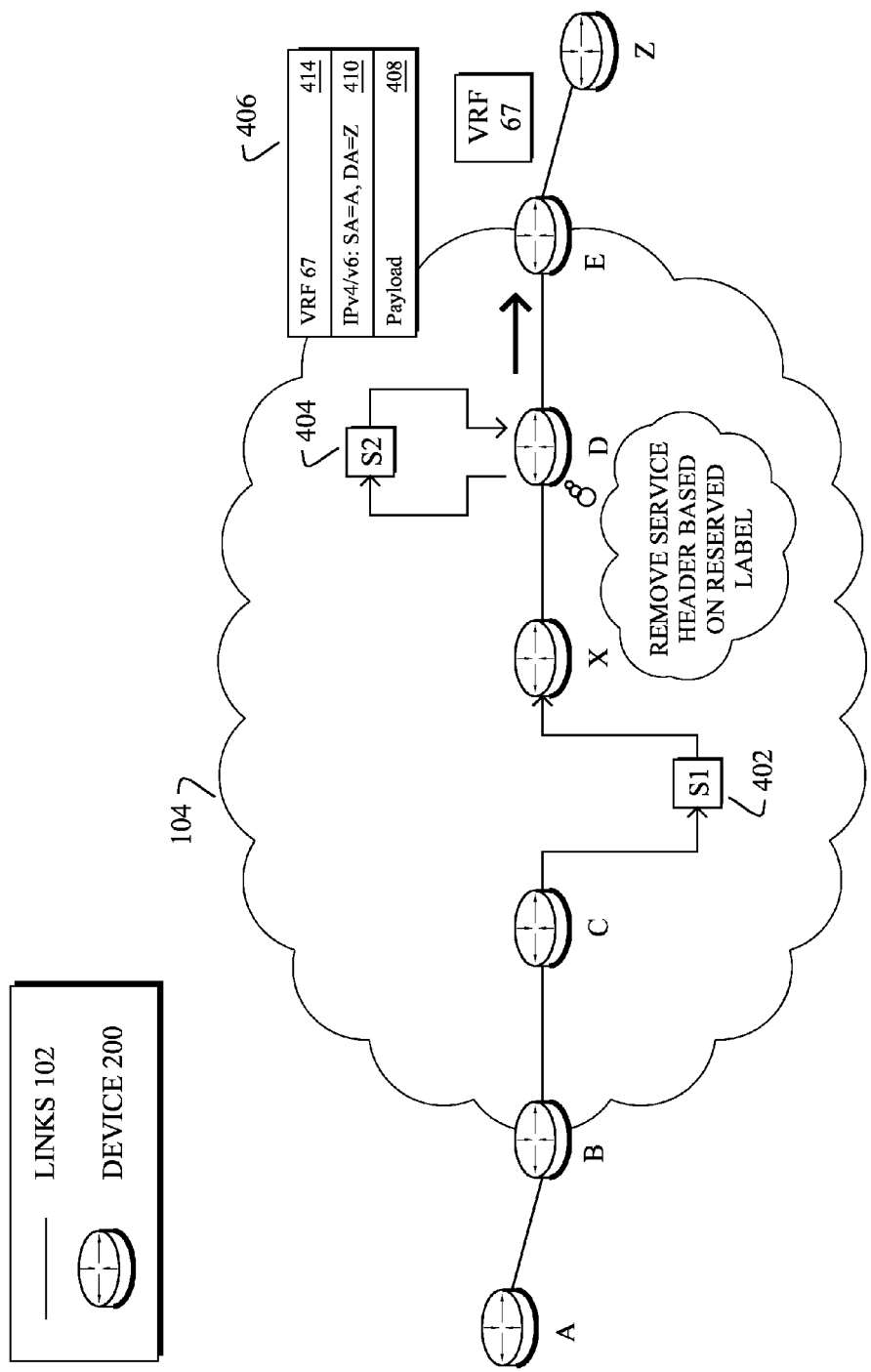
Figure 4N:
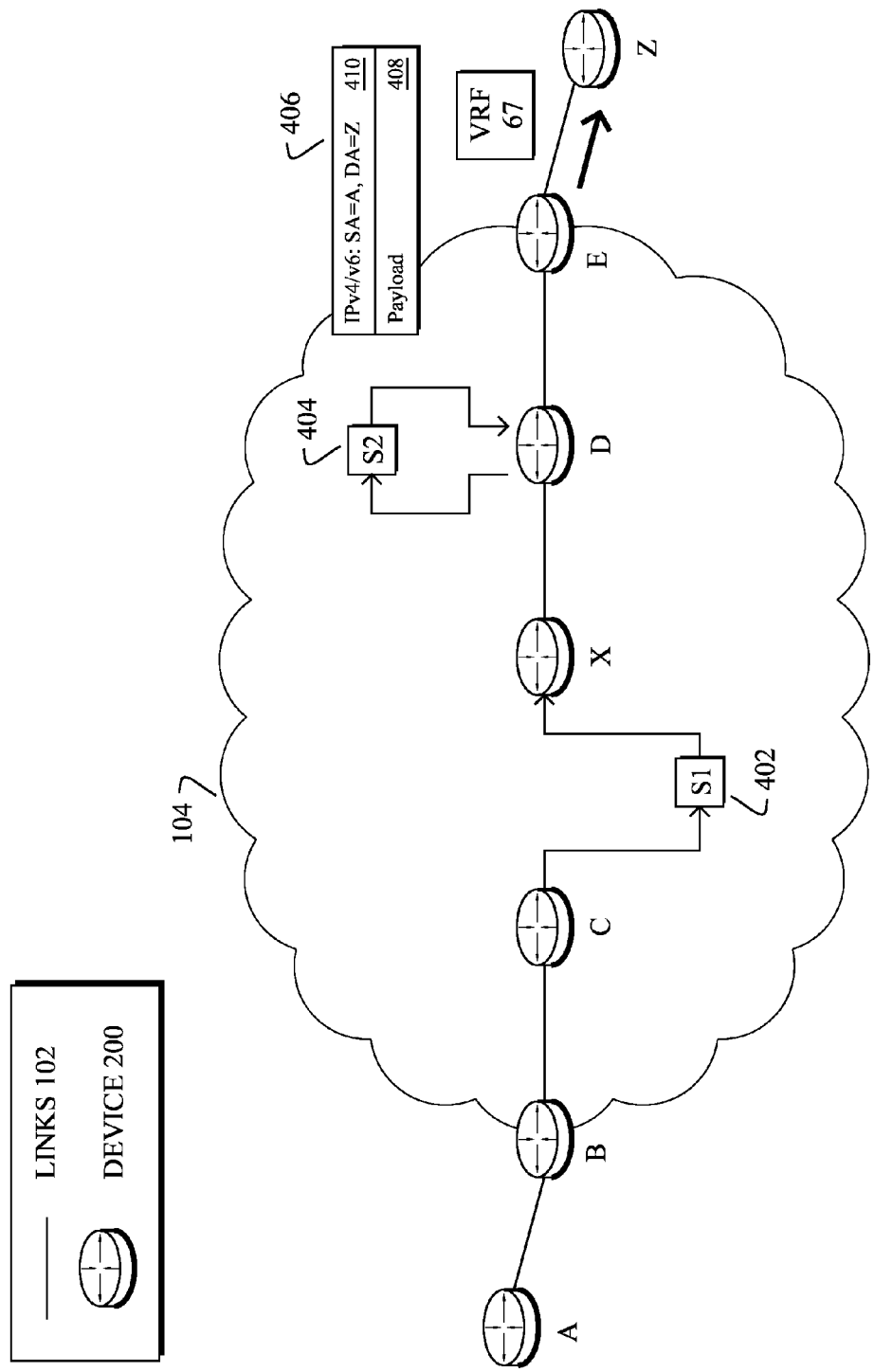

Referring now to FIGS. 4A-4N, a more detailed example of a packet being forwarded through a network is shown, according to various embodiments. As shown in FIG. 4A, assume that network 104 includes a number of services 402, 404 (e.g., service S1, service S2, etc.) that may be performed directly at a given router or, alternatively, by a device interfaced with the router. For example, services 402-404 may include caching services, firewall services, anti-intrusion services, malware detection services, DPI services, acceleration services, load balancing services, LI services, optimization services, or the like.

In FIG. 4B, source device A may send a packet 406 towards ingress device B, with a final destination of device Z. As shown, packet 406 may include a payload 408 and an IPv4 or IPv6 header 410 that identifies the address of source device A and the address of destination device Z.

In FIG. 4C, ingress device B, or another device in communication therewith, may determine whether packet 406 should be sent through a service chain and, if so, which services should be applied to packet 406. For example, device B may classify packet 406 from device A based on the information in header 410 (e.g., the source address, the destination address, etc.), based on an application associated with packet 406, based on the payload 408, etc. In turn, device B may add a service chain header 412 to packet 406. In some embodiments, service chain header 412 may be an NSH protocol header that includes metadata for use by the services in the service chain, an identification of the service path (e.g., SPI, etc.), or the like. As would be appreciated, the service path may not actually be used for purposes of forwarding packet 406, but instead provide context to the data plane regarding the service chain.

In FIG. 4D, device B may also generate a set of forwarding labels 414-424, to forward packet 406 throughout network 104. In various embodiments, the forwarding labels may correspond to a set of SIDs that identify a set of network segments. Notably, the generated forwarding labels may be used to represent the corresponding set of devices/services via which packet 600 should be forwarded. For example, labels 414-424 may be ordered according to the order in which the devices/services are to process packet 406. Device B may then add the ordered labels 414-424 to packet 406, thereby encapsulating service chain header 412.

In FIG. 4E, device B may forward packet 406 on to the device C, as indicated by label 424. As would be appreciated, any number of devices may exist along a given segment, such as between devices B and C. Such an intermediary device, or device B, depending on the segment, may then perform a POP operation on label 424 before finally forwarding packet 406 on to device C.

In FIG. 4F, device C may analyze the topmost label 422 in received packet 406 and determine that label 422 corresponds to service S1. In various embodiments, rather than perform a POP operation on label 422, device C may instead perform a SWAP operation for a reserved label 426 that is used in the service chain to denote that packet 406 includes an encapsulated service chain header 412, such as an NSH protocol header. Device C then forwards packet 406 on to service S1.

In FIG. 4G, service S1 may determine that packet 406 includes encapsulated service chain header 412, based on the inclusion of reserved label 426 by device C. In turn, in some embodiments, service S1 may remove the forwarding labels from packet 406, to expose service chain header 412, and perform the corresponding service on packet 406 using header 412. After performing the function/service, service S1 may replace labels 414-420 and forward packet 406 towards its next segment destination, device D, as indicated by label 420.

In FIG. 4H, device X (e.g., an intermediary device along the segment) may remove label 420 from packet 406, which indicates that the segment concludes with device D. In turn, device X may forward packet 406 on to device D. At this point, the topmost label in forwarded packet 406 is label 418, which indicates service S2.

In FIG. 4I, device D may perform a similar function as that of device C in FIG. 4F. Notably, device D may identify the topmost label 418 as corresponding to service S1 and, in response, perform a SWAP operation to replace label 418 with reserved label 428. Device D then forwards packet 406 on to service S1.

According to various embodiments, two possibilities exist with respect to processing of packet 406 by service S2, depending on whether or not service S2 is also configured to function as a service function forwarder (SFF). In either case, service S2 may identify reserved forwarding label 428 as indicating the presence of encapsulated service chain header 412 and perform the requisite service on the packet using service chain header 412.

In FIGS. 4J-4K, an example is shown in which service S2 is operable to act as an SFF. In such cases, service S2 may be operable to also remove service chain header 412 from packet 406. In particular, service S2 may analyze the path identifier of header 412 to determine that service S2 is the last service in the service chain. In turn, service S2 may remove service chain header 412 from packet 406, replace labels 414-416, and forward packet 406 back to device D, as shown in FIG. 4J. In FIG. 4K, device D then pops label 416 and forwards packet 406 on to device E, as indicated by label 416.

In FIGS. 4L-4M, an example is shown whereby device D is operable to function as an SFF, instead of service S2. As shown in FIG. 4L, in some embodiments, if service S2 is not capable of performing SFF operations, it may replace reserved label 428 and labels 414-416 onto the stack of packet 406, and forward packet 406 back to device D. As shown in FIG. 4M, in some embodiments, device D may be configured to recognize reserved label 428 received from service S2 as indicative of packet 406 requiring processing by the SFF of device D. In response, device D may determine that the service chain has ended (e.g., based on the path identifier in header 412) and remove service chain header 412 from packet 406 before forwarding packet 406 on to device E.

In FIG. 4N, device E may pop forwarding label 410 from packet 406, to determine that packet 406 should be forwarded via a particular egress connection, as indicated in virtual routing and forwarding (VRF) instance 67. VRFs generally allow a router or other networking device to maintain distinct forwarding table instances. For example, the table in VRF instance 67 may indicate the route to the destination address of device Z (e.g., as indicated in IP header 410). In turn, device E may forward packet 406 on to the destination device E.

Figure 5:
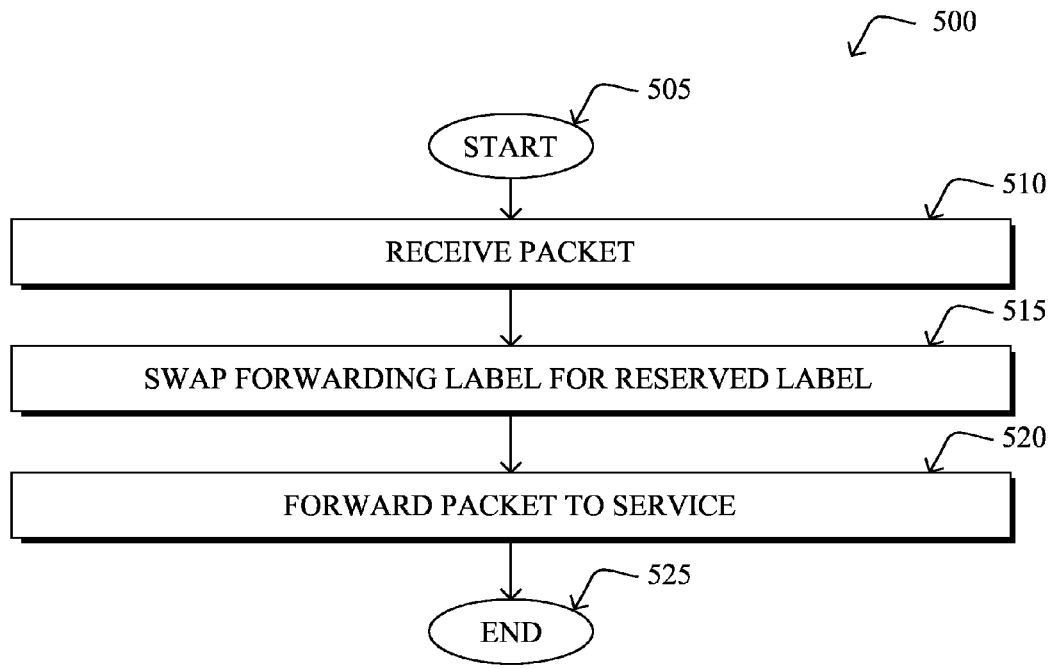
FIG. 5 illustrates an example simplified procedure for forwarding a packet to a service.

Referring now to FIG. 5, an example simplified procedure is shown for forwarding a packet to a service, according to various embodiments. In various embodiments, procedure 500 may be performed by an electronic device in a computer network (e.g., device 200, etc.) that executes machine instructions operable to perform procedure 500 (e.g., processes 244, 248). Procedure 500 may begin at step 505 and continue on to step 510 where, as described in greater detail above, the device may receive a packet that includes a forwarding label for a service in a service chain. The packet may also encapsulate a service chain header for the service chain. For example, the forwarding label may correspond to a segment routing label, such as an MPLS-SR label, or the like, that identifies the service to be performed on the packet.

At step 515, as described in greater detail above, the device may swap the forwarding label for a reserved label. In various embodiments, the reserved label may be a forwarding label having a reserved value that indicates to the services in the service chain that the corresponding packet encapsulates a service chain header. In this context, encapsulation refers to the existence of the service chain header below the stack of forwarding labels appended to the packet for purposes of forwarding decisions. For example, a particular reserved label may indicate that the packet includes an NSH protocol header below its MPLS-SR forwarding label stack. Such a service chain header may include metadata of use when performing the services on the packet, an indication of the particular service chain path (e.g., the order in which the services are to be applied to the packet, etc.), or any other information that may be of use to the service chain. As would be appreciated, such a header may be used specifically within the context of the service chain and not used for purposes of actually forwarding the packet, which is left to the stack of forwarding labels.

At step 520, the device may forward the packet with the reserved label to the service, as detailed above. In doing so, the service may be operable to identify the reserved label as indicating that the packet includes the service chain header, to access the service chain header when performing the service. For example, if the device performs a SWAP operation on the forwarding label for the service to replace the forwarding label with a label of value <100>, the service may recognize this value as indicating that the packet also includes an NSH protocol header. Procedure 500 then ends at step 525.

Figure 6:
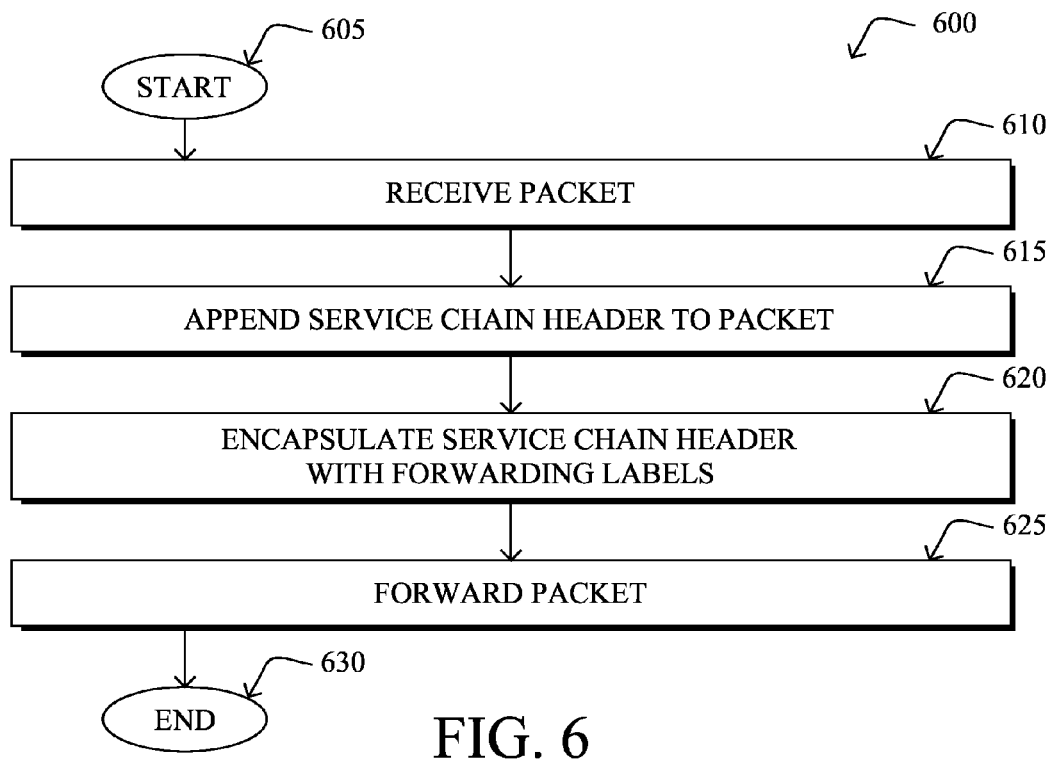
FIG. 6 illustrates an example simplified procedure for encapsulating a service chain header in a packet.

FIG. 6 illustrates an example simplified procedure for encapsulating a service chain header in a packet, according to various embodiments. In various embodiments, procedure 600 may be performed by an electronic device in a computer network (e.g., device 200, etc.) that executes machine instructions operable to perform procedure 600 (e.g., processes 244, 248), particularly by a networking device that ingresses a packet into a network. Procedure 600 may begin at step 605 and continue on to step 610 where, as described in greater detail above, the device may receive a packet for forwarding through the network.

At step 615, as detailed above, the device may append a service chain header to the packet. In various embodiments, the device may determine the service chain based on an analysis of the incoming packet. For example, the device may determine which services are to be applied to the packet based on the source of the packet, the destination of the packet, an application associated with the packet, other information associated with the packet, etc. Based on the determined service chain header, the device may generate and append a corresponding service chain header to the packet that identifies the particular service chain (e.g., an SPI, etc.), metadata that facilitates the performance of the services, etc. For example, in one embodiment, the service chain header may be an NSH protocol header.

At step 620, the device may encapsulate the service chain header in the packet by appending a set of forwarding labels to the packet, as detailed above. The forwarding labels may be, for example, segment routing labels, whereby a particular forwarding label may indicate a particular service in the service chain. For example, the device may generate and append a set of MPLS-SR labels or the like, to the packet.

At step 625, as detailed above, the device may forward the packet, including the encapsulated service chain header, into the network. In various embodiments, the particular forwarding label associated with a particular service in the service chain may be operable to cause another device in the network to swap the particular forwarding label for a reserved label that identifies the packet as encapsulating the service chain header. In doing so, the service may be able to determine that the packet includes the service chain header below the forwarding label stack of the packet. Procedure 600 then ends at step 630.

It should be noted that while certain steps within procedures 500-600 may be optional as described above, the steps shown in FIGS. 5-6 are merely examples for purposes of illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide a seamless integration of segment routing techniques, such as MPLS-SR, with a service function chaining mechanisms, such as SFC. In particular, the techniques herein allow for including an indication of a service chain header within the SR stack. In some aspects, the techniques provide an integration of SR with NSH, such that a segment header indicates the presence of an NSH, while steers traffic through service nodes, and the NSH allows for service and path identification and metadata sharing. In this context, the "segment header" is an abstract construct, identified by a set of Segment IDs (SIDs), in an abstract fashion.

As the techniques herein leverage the use of SIDs, it can be realized with different segment data plane types, in various embodiments. Specifically, the techniques herein cover operation over MPLS and IPv6 data planes using SIDs. In further aspects, the indication of an NSH or other service chain header may be made via a custom label. This can be implemented in two different ways. First, this can be implemented with the use of a reserved label, such as a Special Purpose Label (SPL). This in turn can be a single SPL or an extended reserved pair (ESPL/SPL). Second, a regular signaled MPLS Label can indicate the presence of an NSH or another service chain header, and this may be signaled.

While there have been shown and described illustrative embodiments that allow service chaining mechanisms to be used in conjunction with segment routing techniques, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, a packet that includes a forwarding label for a service in a service chain, wherein the packet encapsulates a service chain header for the service chain, and wherein the service chain is selected based on an analysis of the packet that determines which services are to be applied to the packet;
   swapping, by the device, the forwarding label for the service in the packet for a reserved label, wherein the reserved label includes a reserved value that indicates to the service in the service chain that the packet encapsulates the service chain header below the forwarding label for purposes of forwarding decisions; and
   forwarding, by the device, the packet with the reserved label to the service.

2. The method as in claim 1, wherein the service chain header comprises metadata used by the service.

3. The method as in claim 1, wherein the service chain header is not used for purposes of forwarding the packet in the network.

4. The method as in claim 1, further comprising:
   receiving, at the device, the packet from the service, wherein the packet received from the service includes the reserved label; and
   removing, by the device, the service chain header from the packet, in response to receiving the reserved label.

5. The method as in claim 1, wherein the service chain header is a Network Service Header (NSH) protocol header.

6. The method as in claim 5, wherein the forwarding label is a multiprotocol label switching, segment routing (MPLS-SR) label.

7. A method, comprising:
   receiving, at a first device in a network, a packet for forwarding through the network;
   appending, by the first device, a service chain header to the packet for a service chain wherein the service chain is selected based on an analysis of the packet that determines which services are to be applied to the packet;

encapsulating, by the first device, the service chain header for the service chain in the packet by appending a set of forwarding labels to the packet, wherein the set of forwarding labels includes a particular forwarding label that identifies a particular service in the service chain, and wherein the set of forwarding labels are segment routing labels; and forwarding, by the first device and based on the set of forwarding labels, the packet including the encapsulated service chain header into the network, wherein the particular forwarding label is operable to cause a second device in the network to swap the particular forwarding label for a reserved label that identifies the packet as encapsulating the service chain header.

8. The method as in claim 7, wherein the service chain header comprises metadata used by the service.

9. The method as in claim 7, wherein the analysis indicates at least one of: a source of the packet, a destination of the packet, or an application associated with the packet.

10. The method as in claim 7, wherein the service chain header is a Network Service Header (NSH) protocol header.

11. The method as in claim 10, wherein the forwarding label is a multiprotocol label switching, segment routing (MPLS-SR) label.

12. An apparatus, comprising:
one or more network interfaces to communicate with a network;
a processor coupled to the network interfaces and configured to execute one or more processes; and
a memory configured to store a process executable by the processor, the process when executed operable to:
receive a packet that includes a forwarding label for a service in a service chain, wherein the packet encapsulates a service chain header for the service chain, and wherein the service chain is selected based on an analysis of the packet that determines which services are to be applied to the packet;
swap the forwarding label for the service in the packet for a reserved label, wherein the reserved label includes a reserved value that indicates to the service in the service chain that the packet encapsulates the service chain header below the forwarding label for purposes of forwarding decisions; and
forward the packet with the reserved label to the service.

13. The apparatus as in claim 12, wherein the service chain header comprises metadata used by the service.

14. The apparatus as in claim 12, wherein the service chain header is not used for purposes of forwarding the packet in the network.

15. The apparatus as in claim 12, wherein the process when executed is further operable to:
receive the packet from the service, wherein the packet received from the service includes the reserved label; and
remove the service chain header from the packet, in response to receiving the reserved label.

16. The apparatus as in claim 12, wherein the service chain header is a Network Service Header (NSH) protocol header.

17. The apparatus as in claim 16, wherein the forwarding label is a multiprotocol label switching, segment routing (MPLS-SR) label.

18. An apparatus, comprising:
one or more network interfaces to communicate with a network;
a processor coupled to the network interfaces and configured to execute one or more processes; and
a memory configured to store a process executable by the processor, the process when executed operable to:
receive a packet for forwarding through the network;
append a service chain header to the packet for a service chain, wherein the service chain is selected based on an analysis of the packet that determines which services are to be applied to the packet;
encapsulate the service chain header for the service chain in the packet by appending a set of forwarding labels to the packet, wherein the set of forwarding labels includes a particular forwarding label that identifies a particular service in the service chain, and wherein the set of forwarding labels are segment routing labels; and
forward, based on the set of forwarding labels, the packet including the encapsulated service chain header into the network, wherein the particular forwarding label is operable to cause a device in the network to swap the particular forwarding label for a reserved label that identifies the packet as encapsulating the service chain header.

19. The apparatus as in claim 18, wherein the service chain header comprises metadata used by the service.

20. The apparatus as in claim 18, wherein the analysis indicates at least one of: a source of the packet, a destination of the packet, or an application associated with the packet.

21. The apparatus as in claim 18, wherein the service chain header is a Network Service Header (NSH) protocol header.

22. The apparatus as in claim 21, wherein the forwarding label is a multiprotocol label switching, segment routing (MPLS-SR) label.

* * * * *